US012681950B2

(12) United States Patent
Bakholdina et al.

(10) Patent No.: US 12,681,950 B2
(45) Date of Patent: Jul. 14, 2026

(54) SYSTEMS, METHODS, AND APPARATUSES FOR COMBINING, INTERPRETING, AND DISTRIBUTING NON-UNIFORM DATASETS INTO STRUCTURED DATASETS

(71) Applicant: BANK OF AMERICA CORPORATION, Charlotte, NC (US)

(72) Inventors: Natalia Bakholdina, Manhattan, NY (US); Andrew Stellman, Brooklyn, NY (US); Alexander James Diestler, Downers Grove, IL (US); Joseph Eric Pringle, Long Island City, NY (US); Mayer Crystal, Bergenfield, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/387,578

(22) Filed: Nov. 7, 2023

(65) Prior Publication Data

US 2025/0147978 A1     May 8, 2025

(51) Int. Cl.
  *G06F 16/25*       (2019.01)
  *G06F 16/178*      (2019.01)

(52) U.S. Cl.
  CPC ........ *G06F 16/258* (2019.01); *G06F 16/1794* (2019.01)

(58) Field of Classification Search
  CPC ........................... G06F 16/258; G06F 16/1794
  See application file for complete search history.

(56) References Cited

U.S. PATENT DOCUMENTS

| | | | |
|---|---|---|---|
| 8,126,908 B2 | 2/2012 | Vasudevan | |
| 8,688,504 B2 | 4/2014 | Reisman | |
| 8,688,710 B2 | 4/2014 | Vanasco | |
| 10,275,285 B1 * | 4/2019 | Gold | ..................... G06F 3/0649 |
| 11,036,697 B2 | 6/2021 | Griffith | |
| 11,036,716 B2 | 6/2021 | Griffith | |
| 11,042,537 B2 | 6/2021 | Griffith | |
| 11,042,548 B2 | 6/2021 | Griffith | |
| 11,042,560 B2 | 6/2021 | Griffith | |
| 11,068,847 B2 | 7/2021 | Boutros | |

(Continued)

*Primary Examiner* — Kavita Stanley
*Assistant Examiner* — Lin Lin M Htay
(74) *Attorney, Agent, or Firm* — Moore & Van Allen PLLC; Lauren M. Stokes

(57) ABSTRACT

Systems, computer program products, and methods are described herein for a system for combining, interpreting, and distributing non-uniform datasets into structured datasets, the system comprising: a memory device with computer-readable program code stored thereon, a communication device, and a processing device operatively coupled to the memory device and the communication device. The processing device identifies a configuration file with location information for at least one dataset or script file, retrieves the dataset, builds a tree of execution comprising at least one node wherein each node comprises data, executes the script file on two or more datasets in parallel on a computational cluster comprising at least one computing component, wherein the at least one computing component comprises an at least one node and generates an output comprising as a structured dataset, wherein the structured dataset comprises a standardized format associated with the at least one instruction of the script file.

19 Claims, 9 Drawing Sheets

(56) References Cited

U.S. PATENT DOCUMENTS

| | | | | |
|---|---|---|---|---|
| 11,093,633 | B2 | 8/2021 | Jacob | |
| 11,126,635 | B2 | 9/2021 | Behzadi | |
| 11,146,574 | B2 | 10/2021 | Muddu | |
| 11,163,755 | B2 | 11/2021 | Jacob | |
| 11,210,313 | B2 | 12/2021 | Reynolds | |
| 11,334,625 | B2 | 5/2022 | Jacob | |
| 11,366,824 | B2 | 6/2022 | Jacob | |
| 11,455,168 | B1 * | 9/2022 | Potyraj ................... | G06F 16/14 |
| 11,704,313 | B1 * | 7/2023 | Andrade ........... | G06F 16/24535 |
| | | | | 707/714 |
| 2002/0029207 | A1 | 3/2002 | Bakalash | |
| 2002/0133476 | A1 | 9/2002 | Reinhardt | |
| 2004/0064456 | A1 | 4/2004 | Fong | |
| 2009/0037457 | A1 | 2/2009 | Musgrove | |
| 2012/0022939 | A1 * | 1/2012 | Tiwari ................... | G06Q 30/02 |
| | | | | 705/14.43 |
| 2017/0277736 | A1 * | 9/2017 | Sharma ................. | G06F 16/353 |
| 2020/0401697 | A1 * | 12/2020 | Smith ................... | G06F 21/566 |

* cited by examiner

140

156

I/O DEVICE

162

164    AUDIO CODEC

166    CONTROL INTERFACE

DISPLAY INTERFACE

170    RECEIVER

160    TRANSCEIVER

152    PROCESSOR

158    COMMUNICATION INTERFACE

154    MEMORY

MEMORY

MEMORY

EXTERNAL INTERFACE

168

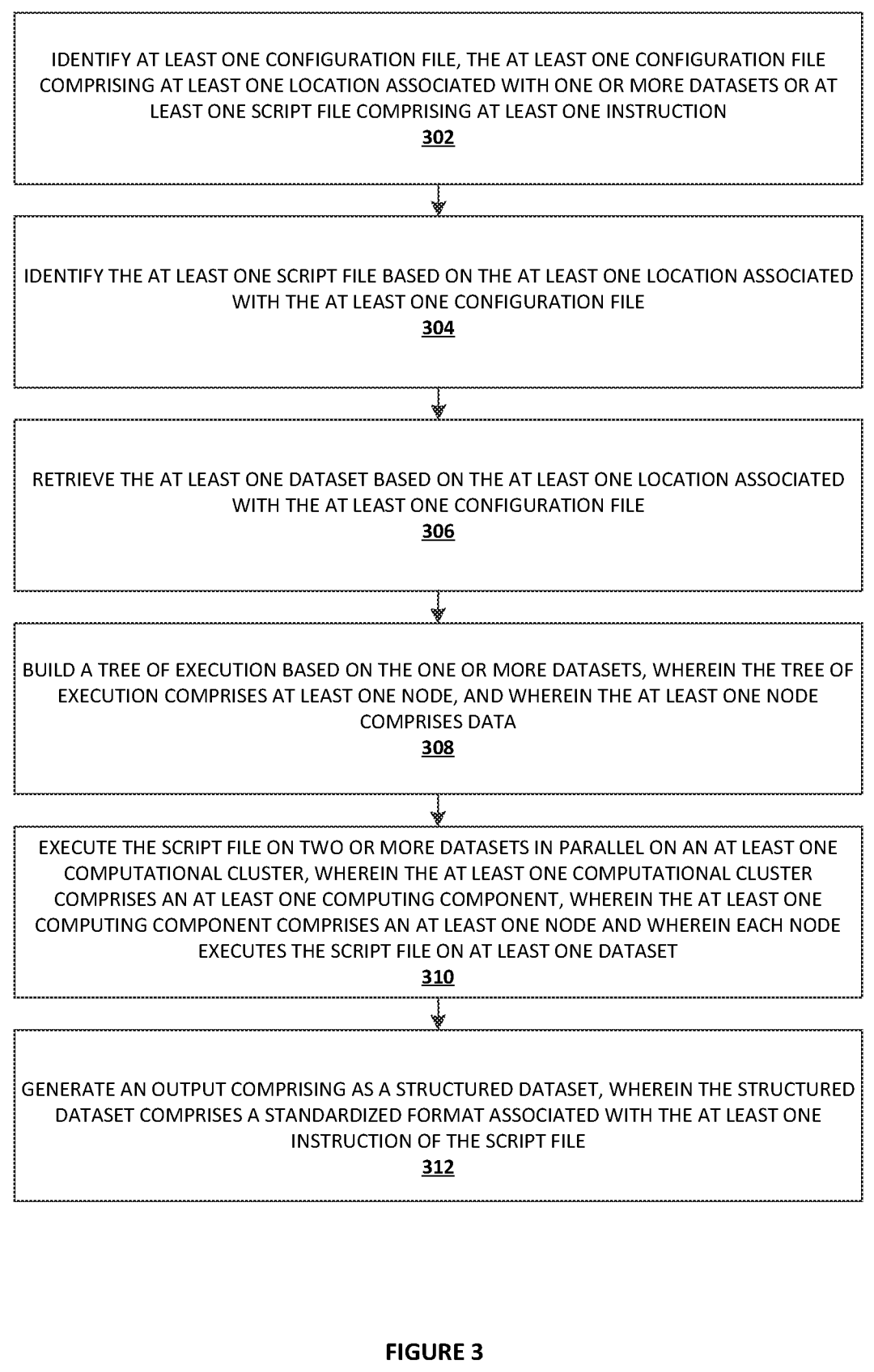

IDENTIFY AT LEAST ONE CONFIGURATION FILE, THE AT LEAST ONE CONFIGURATION FILE COMPRISING AT LEAST ONE LOCATION ASSOCIATED WITH ONE OR MORE DATASETS OR AT LEAST ONE SCRIPT FILE COMPRISING AT LEAST ONE INSTRUCTION
302

IDENTIFY THE AT LEAST ONE SCRIPT FILE BASED ON THE AT LEAST ONE LOCATION ASSOCIATED WITH THE AT LEAST ONE CONFIGURATION FILE
304

RETRIEVE THE AT LEAST ONE DATASET BASED ON THE AT LEAST ONE LOCATION ASSOCIATED WITH THE AT LEAST ONE CONFIGURATION FILE
306

BUILD A TREE OF EXECUTION BASED ON THE ONE OR MORE DATASETS, WHEREIN THE TREE OF EXECUTION COMPRISES AT LEAST ONE NODE, AND WHEREIN THE AT LEAST ONE NODE COMPRISES DATA
308

EXECUTE THE SCRIPT FILE ON TWO OR MORE DATASETS IN PARALLEL ON AN AT LEAST ONE COMPUTATIONAL CLUSTER, WHEREIN THE AT LEAST ONE COMPUTATIONAL CLUSTER COMPRISES AN AT LEAST ONE COMPUTING COMPONENT, WHEREIN THE AT LEAST ONE COMPUTING COMPONENT COMPRISES AN AT LEAST ONE NODE AND WHEREIN EACH NODE EXECUTES THE SCRIPT FILE ON AT LEAST ONE DATASET
310

GENERATE AN OUTPUT COMPRISING AS A STRUCTURED DATASET, WHEREIN THE STRUCTURED DATASET COMPRISES A STANDARDIZED FORMAT ASSOCIATED WITH THE AT LEAST ONE INSTRUCTION OF THE SCRIPT FILE
312

FIGURE 3

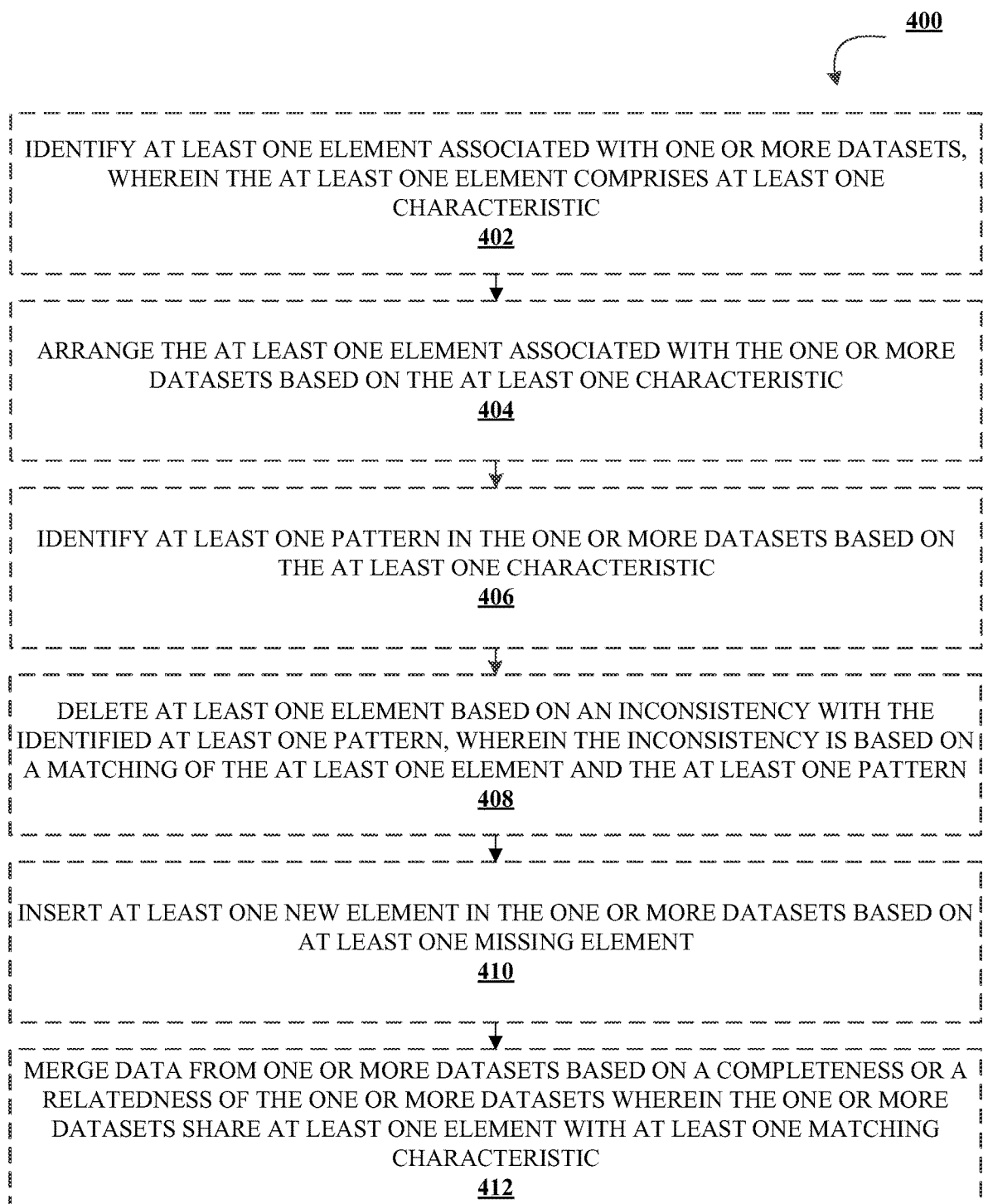

400

IDENTIFY AT LEAST ONE ELEMENT ASSOCIATED WITH ONE OR MORE DATASETS, WHEREIN THE AT LEAST ONE ELEMENT COMPRISES AT LEAST ONE CHARACTERISTIC
402

ARRANGE THE AT LEAST ONE ELEMENT ASSOCIATED WITH THE ONE OR MORE DATASETS BASED ON THE AT LEAST ONE CHARACTERISTIC
404

IDENTIFY AT LEAST ONE PATTERN IN THE ONE OR MORE DATASETS BASED ON THE AT LEAST ONE CHARACTERISTIC
406

DELETE AT LEAST ONE ELEMENT BASED ON AN INCONSISTENCY WITH THE IDENTIFIED AT LEAST ONE PATTERN, WHEREIN THE INCONSISTENCY IS BASED ON A MATCHING OF THE AT LEAST ONE ELEMENT AND THE AT LEAST ONE PATTERN
408

INSERT AT LEAST ONE NEW ELEMENT IN THE ONE OR MORE DATASETS BASED ON AT LEAST ONE MISSING ELEMENT
410

MERGE DATA FROM ONE OR MORE DATASETS BASED ON A COMPLETENESS OR A RELATEDNESS OF THE ONE OR MORE DATASETS WHEREIN THE ONE OR MORE DATASETS SHARE AT LEAST ONE ELEMENT WITH AT LEAST ONE MATCHING CHARACTERISTIC
412

FIGURE 4

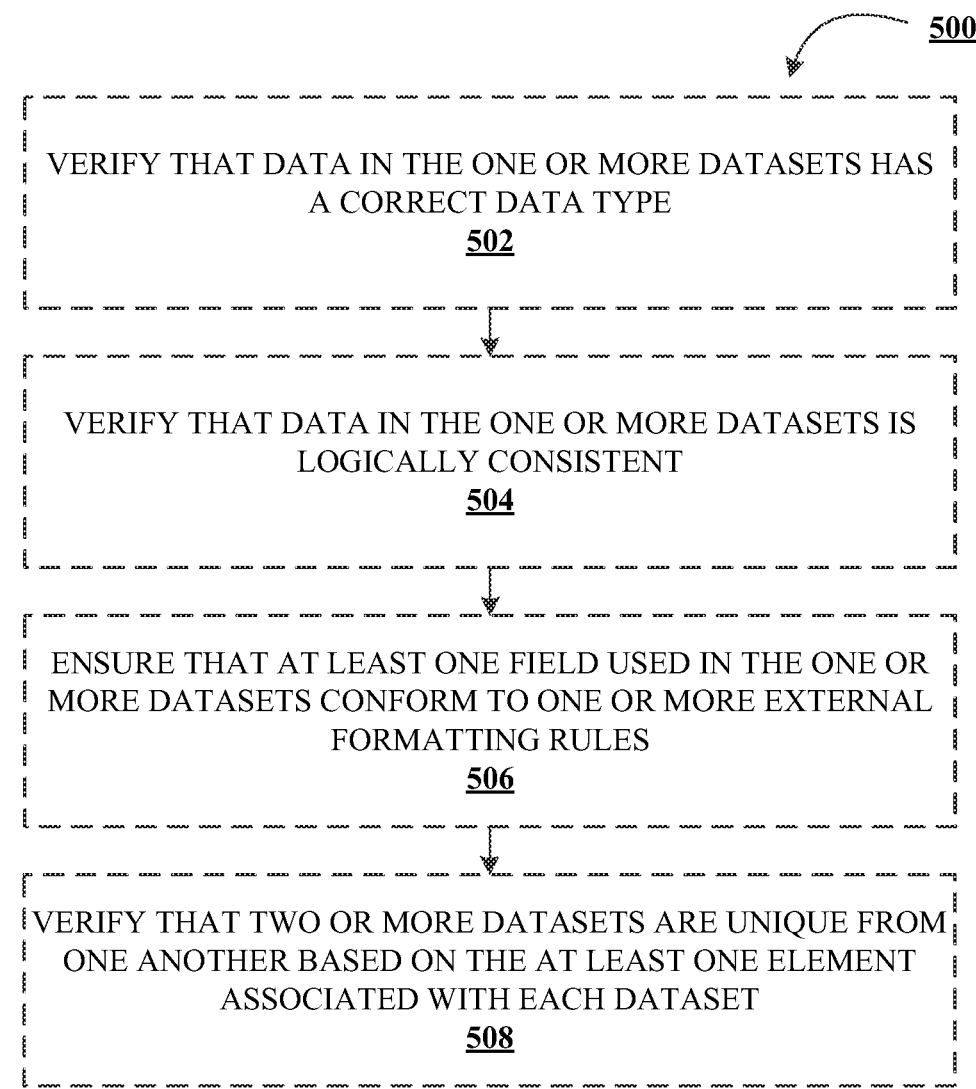

VERIFY THAT DATA IN THE ONE OR MORE DATASETS HAS A CORRECT DATA TYPE
502

VERIFY THAT DATA IN THE ONE OR MORE DATASETS IS LOGICALLY CONSISTENT
504

ENSURE THAT AT LEAST ONE FIELD USED IN THE ONE OR MORE DATASETS CONFORM TO ONE OR MORE EXTERNAL FORMATTING RULES
506

VERIFY THAT TWO OR MORE DATASETS ARE UNIQUE FROM ONE ANOTHER BASED ON THE AT LEAST ONE ELEMENT ASSOCIATED WITH EACH DATASET
508

FIGURE 5

SYSTEMS, METHODS, AND APPARATUSES FOR COMBINING, INTERPRETING, AND DISTRIBUTING NON-UNIFORM DATASETS INTO STRUCTURED DATASETS

FIELD OF THE INVENTION

The present disclosure embraces a distributed execution engine for combining, interpreting, and distributing non-uniform datasets into structured datasets.

BACKGROUND

Data processing is a critical component of information systems and has become ubiquitous across many industries. The proliferation of digital technology now requires many businesses to regularly store and process massive amounts of data in order to stay competitive or remain in compliance with industry or governmental standards. Distributed computing systems maximize efficiency for data processing by distributing the data processing tasks across multiple computing nodes. However, even with access to distributed computing systems, processing large amounts of data can require a substantial investment of time, manpower, and funding. Specifically, data must be prepared for use in distributed computing systems, meaning that businesses may be forced to employ highly skilled teams of programmers and computer engineers to effectively leverage these systems. Further, data is often pulled from multiple sources that operate independently of one another and do not share any uniform method of storing or retrieving that data, making it even more difficult to manage data-processing.

Applicant has identified a number of deficiencies and problems associated with combining, interpreting, and distributing non-uniform datasets into structured datasets. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for combining, interpreting, and distributing non-uniform datasets into structured datasets.

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for initializing a distributed execution engine for combining, interpreting, and distributing non-uniform datasets into structured datasets is provided. The system may comprise: a memory device with computer-readable program code stored thereon; a communication device; a processing device operatively coupled to the memory device and the communication device, wherein the processing device is configured to execute the computer-readable program code to: identify at least one configuration file, the at least one configuration file comprising at least one location associated with one or more datasets or at least one script file comprising at least one instruction, identify the at least one script file based on the at least one location associated with the at least one configuration file, retrieve the at least one dataset based on the at least one location associated with the at least one configuration file, build a tree of execution based on the one or more datasets, wherein the tree of execution comprises at least one node, and wherein the at least one node comprises data, execute the script file on two or more datasets in parallel on an at least one computational cluster, wherein the at least one computational cluster comprises an at least one computing component, wherein the at least one computing component comprises an at least one node and wherein each node executes the script file on at least one dataset, and generate an output comprising as a structured dataset, wherein the structured dataset comprises a standardized format associated with the at least one instruction of the script file.

In some embodiments, executing the script file on two or more datasets in parallel comprises executing instructions associated with the script file on each of the one or more datasets contemporaneously.

In some embodiments, building the tree of execution comprises generating at least one checkpoint, and wherein the at least one checkpoint comprises a periodic storage of at least one intermediate result of the execution of the at least one script file for retrieval at a later time.

In some embodiments, wherein the at least one script file comprises the at least one instruction written in a data centric language comprising at least one extensible language feature, wherein the at least one extensible language feature provides an interface between the at least one instruction and building the tree of execution.

In some embodiments, the processing device is configured to execute the computer-readable program code to execute a linear series of operations to transform input, wherein the linear series of operations comprise one or more of the following steps: identifying at least one element associated with one or more datasets, wherein the at least one element comprises at least one characteristic, arranging the at least one element associated with the one or more datasets based on the at least one characteristic, identifying at least one pattern in the one or more datasets based on the at least one characteristic, deleting at least one element based on an inconsistency with the identified at least one pattern, wherein the inconsistency is based on a matching of the at least one element and the at least one pattern, inserting at least one new element in the one or more datasets based on at least one missing element, and merging data from one or more datasets based on a completeness or a relatedness of the one or more datasets wherein the one or more datasets share at least one element with at least one matching characteristic.

In some embodiments, the processing device is configured to execute the computer readable program code to run a set of rules to ensure the validity of the scripts, wherein the running of the set of rules comprise one or more of the following steps: verifying that data in the one or more datasets has a correct data type, verifying that data in the one or more datasets is logically consistent, ensuring that at least one field used in the one or more datasets conform to one or more external formatting rules, and verifying that two or more datasets are unique from one another based on the at least one element associated with each dataset.

In some embodiments, retrieval of the at least one data source further comprises defining each data source using at least one coordinate that comprises a system name, a dataset name, or a version.

In some embodiments, the script file comprises at least one schema for organizing the output and wherein the at least one schema comprises at least one attribute.

In some embodiments, the at least one schema further comprises a consistent structure for the output.

In another aspect, a computer program product for initializing a distributed execution engine for combining, interpreting, and distributing non-uniform datasets into structured datasets is provided. In some embodiments, the computer program product comprises at least one non-transitory computer-readable medium having computer-readable program code portions embodied therein, the computer-readable program code portions comprising an executable portion configured to: identify at least one configuration file, the at least one configuration file comprising at least one location associated with one or more datasets or at least one script file comprising at least one instruction, identify the at least one script file based on the at least one location associated with the at least one configuration file, retrieve the at least one dataset based on the at least one location associated with the at least one configuration file, build a tree of execution based on the one or more datasets, wherein the tree of execution comprises at least one node, and wherein the at least one node comprises data, execute the script file on two or more datasets in parallel on an at least one computational cluster, wherein the at least one computational cluster comprises an at least one computing component, wherein the at least one computing component comprises an at least one node and wherein each node executes the script file on at least one dataset, and generate an output comprising as a structured dataset, wherein the structured dataset comprises a standardized format associated with the at least one instruction of the script file.

In some embodiments, executing the script file on two or more datasets in parallel comprises executing instructions associated with the script file on each of the one or more datasets contemporaneously.

In some embodiments, building the tree of execution further comprises generating at least one checkpoint, wherein the at least one checkpoint comprises periodic storage of at least one intermediate result of the execution of the at least one script for retrieval at a later time.

In some embodiments, the at least one script file comprises the at least one instruction written in a data centric language comprising at least one extensible language feature, wherein the at least one extensible language feature provides an interface between the at least one instruction and building the tree of execution.

In some embodiments, the processing device is configured to execute the computer-readable program code to execute a linear series of operations to transform input, wherein the linear series of operations comprise one or more of the following steps: identify at least one element associated with one or more datasets, wherein the at least one element comprises at least one characteristic, arrange the at least one element associated with the one or more datasets based on the at least one characteristic, identify at least one pattern in the one or more datasets based on the at least one characteristic, delete at least one element based on an inconsistency with the identified at least one pattern, wherein the inconsistency is based on a matching of the at least one element and the at least one pattern, insert at least one new element in the one or more datasets based on at least one missing element, and merge data from one or more datasets based on a completeness or a relatedness of the one or more datasets wherein the one or more datasets share at least one element with at least one matching characteristic.

In some embodiments, the processing device is configured to execute the computer-readable program code to run a set of rules to ensure the validity of the scripts, wherein the running of the set of rules comprise one or more of the following steps: verifying that data in the one or more datasets has a correct data type, verifying that data in the one or more datasets is logically consistent, ensuring that at least one field used in the one or more datasets conform to one or more external formatting rules, and verifying that two or more datasets are unique from one another based on the at least one element associated with each dataset.

In some embodiments, retrieval of the at least one data source further comprises defining each data source using at least one coordinate that comprises a system name, a dataset name, or a version.

In another aspect, a computer-implemented method for combining, interpreting, and distributing non-uniform datasets into structured datasets is provided.

In some embodiments, the computer-implemented method comprise: identifying at least one configuration file, the at least one configuration file comprising at least one location associated with one or more datasets or at least one script file comprising at least one instruction, identifying the at least one script file based on the at least one location associated with the at least one configuration file, retrieving the at least one dataset based on the at least one location associated with the at least one configuration file, building a tree of execution based on the one or more datasets, wherein the tree of execution comprises at least one node, and wherein the at least one node comprises data, executing the script file on two or more datasets in parallel on an at least one computational cluster, wherein the at least one computational cluster comprises an at least one computing component, wherein the at least one computing component comprises an at least one node and wherein each node executes the script file on at least one dataset, and generating an output comprising as a structured dataset, wherein the structured dataset comprises a standardized format associated with the at least one instruction of the script file.

In some embodiments, execution of the script file on two or more datasets in parallel comprises executing instructions associated with the script file on each of the one or more datasets contemporaneously.

In some embodiments, the tree of execution further comprises at least one checkpoint, and wherein the at least one checkpoint comprises periodic storage of at least one intermediate result of the execution of the at least one script for retrieval at a later time.

In some embodiments, the script file comprises the at least one instruction written in a data centric language comprising at least one extensible language feature, wherein the at least one extensible language feature provides an interface between the at least one instruction and building the tree of execution.

The features, function, and advantages that have been discussed may be achieved independently in various embodiments of the present invention or may be combined with yet other embodiments, further details of which can be seen with reference to the following description and drawings.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
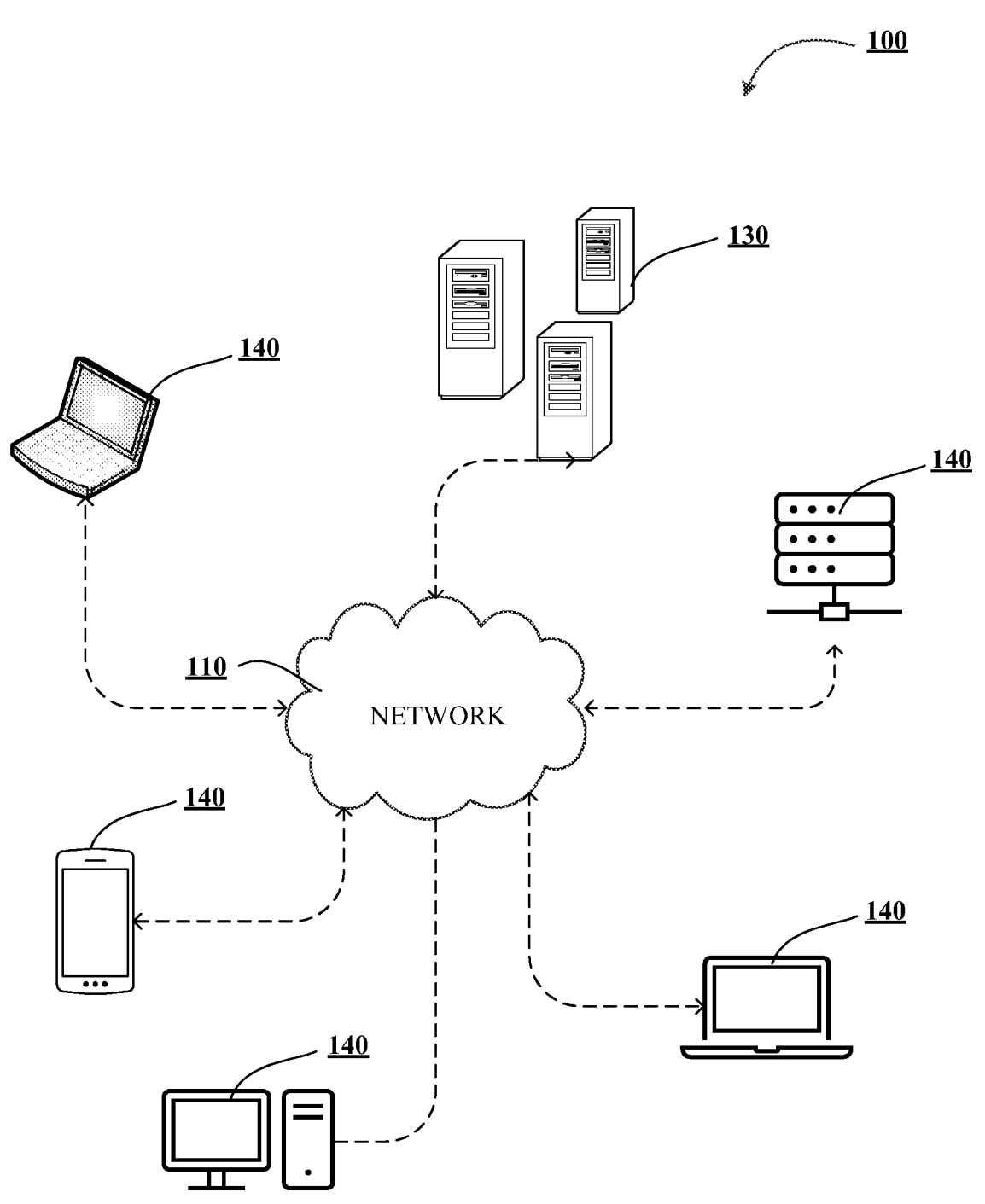
Figure 1B:
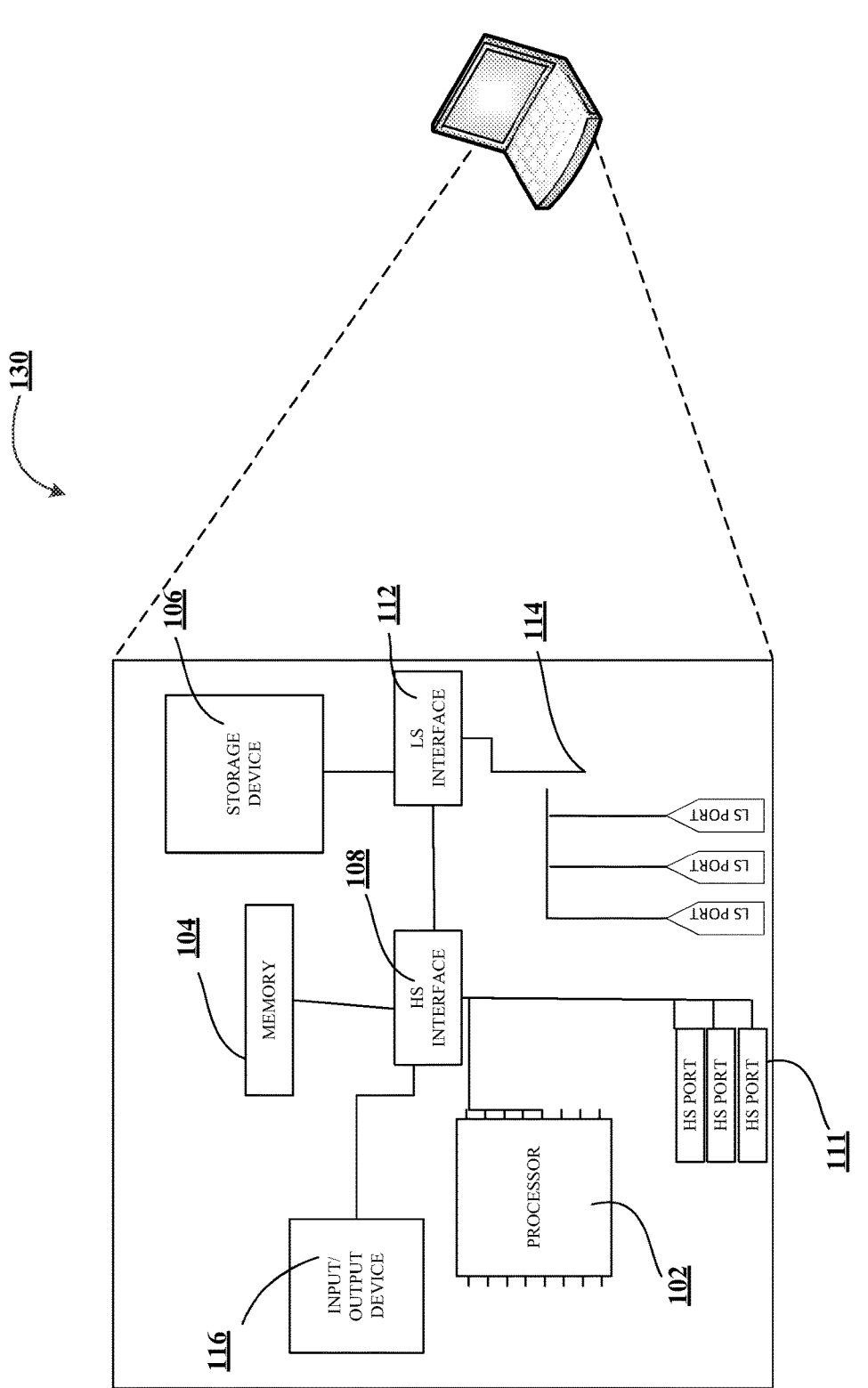
Figure 1C:
Figure 2:
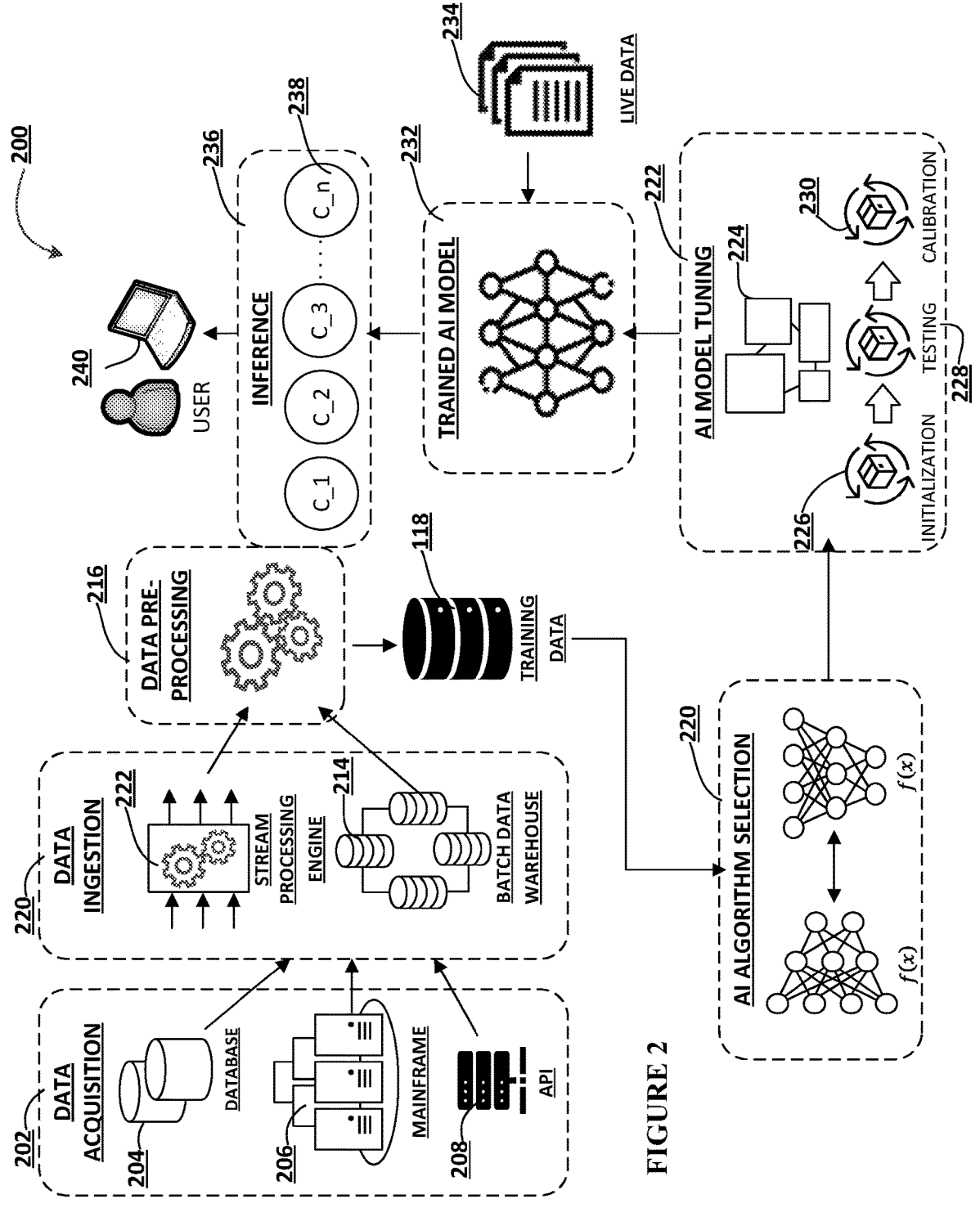
Figure 6:
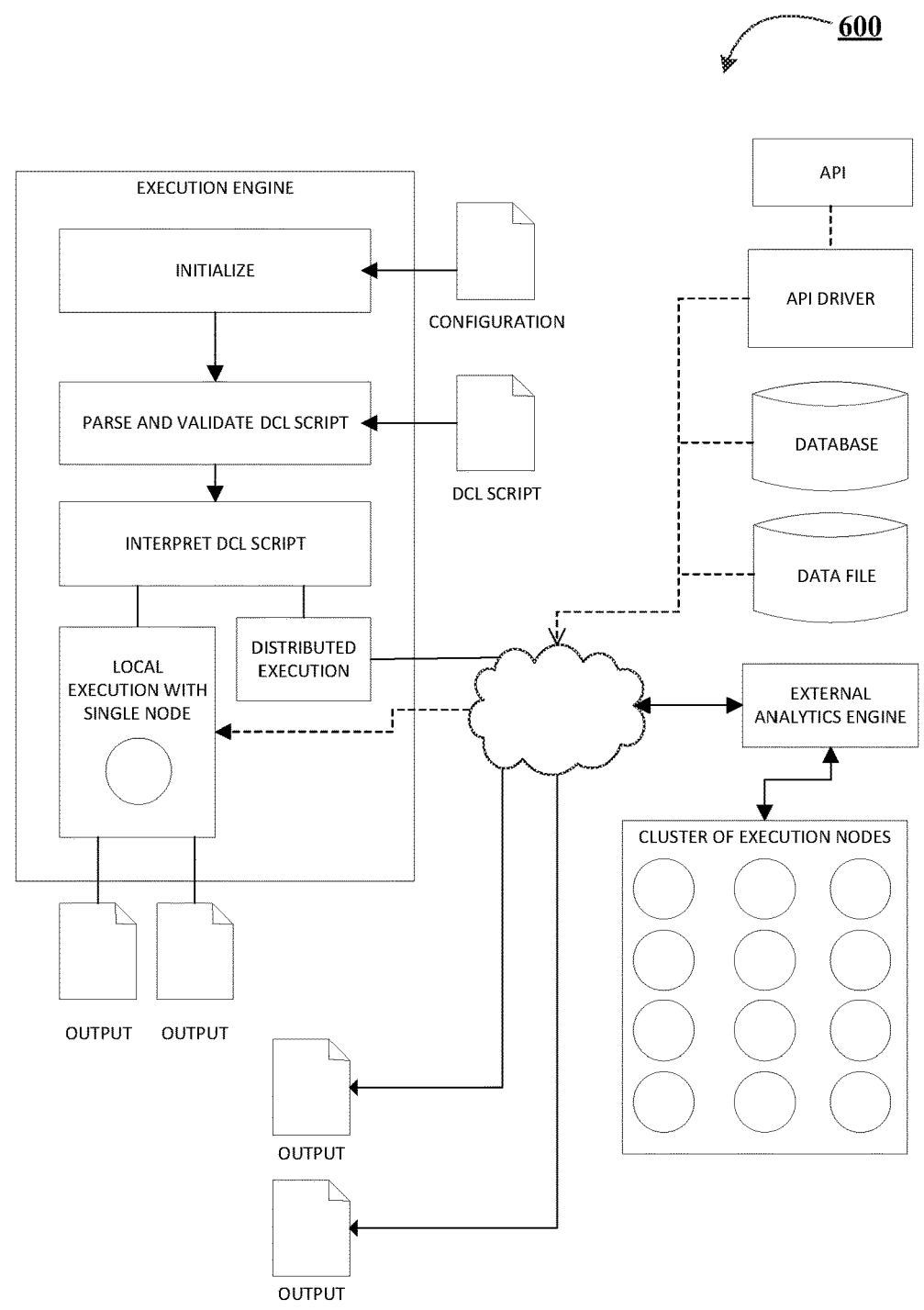
Figure 7:
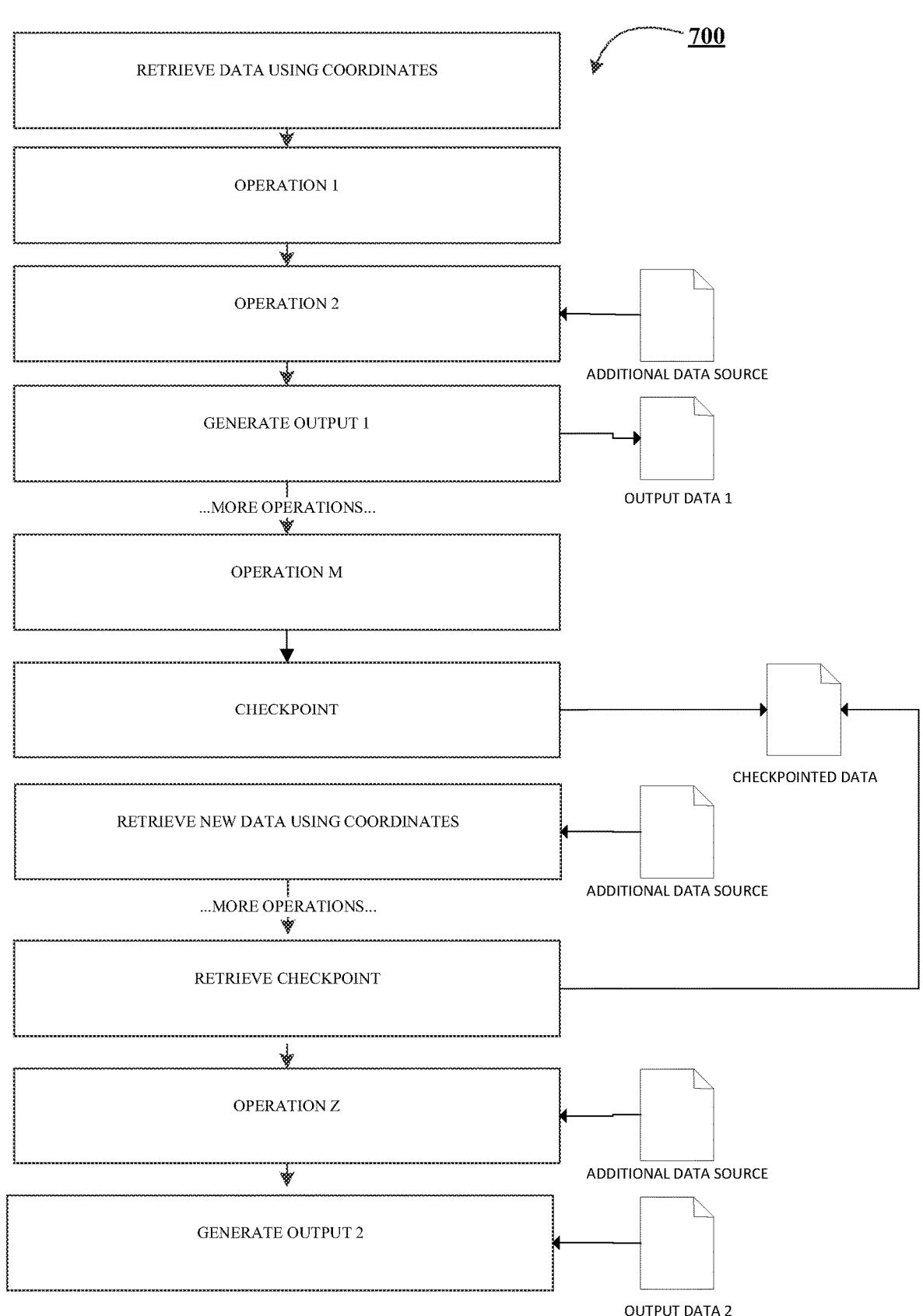

FIGS. 1A-1C illustrates technical components of an exemplary distributed computing environment for a system for combining, interpreting, and distributing non-uniform datasets into structured datasets, in accordance with an embodiment of the disclosure;

FIG. 2 illustrates an exemplary artificial intelligence (AI) subsystem architecture 200, in accordance with embodiments of the disclosure;

FIG. 3 illustrates a process flow for combining, interpreting, and distributing non-uniform datasets into structured datasets, in accordance with an embodiment of the disclosure;

FIG. 4 illustrates a process flow for executing a linear series of operations to transform non-uniform data from one or more datasets, in accordance with an embodiment of the disclosure;

FIG. 5 illustrates a process flow for running a set of rules to ensure the validity of the datasets based on logical consistency, data type, external rules, and uniqueness, in accordance with an embodiment of the disclosure;

FIG. 6 illustrates an exemplary system for combining, interpreting, and distributing non-uniform datasets into structured datasets, in accordance with an embodiment of the disclosure; and FIG. 7 illustrates a process flow for checkpointing data during data processing on a distributed computing system, in accordance with embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, a "computational cluster" may be any group of computing components that are interconnected and work together as a single computing resource. Each computing component in a computing cluster is a node. The nodes may be connected via a local area network or other network. The nodes may, but are not required, to use the same hardware and the same operating system. Computing clusters enable parallel processing, where data processing tasks are distributed across nodes and executed simultaneously.

As used herein, "parallel processing" may refer to any technique by which multiple processors or computing components work in conjunction with one another to execute a task by dividing the overall task into smaller tasks and performing them concurrently. The term "parallel processing" may refer to task parallelism, where tasks assigned to different computing components are performed independently of one another, with all tasks being performed simultaneously. The term "parallel processing" may also refer to data parallelism, where datasets are subdivided and distributed across processors or computing components for simultaneous execution. Data parallelism may be especially helpful when there are a few operations that must be executed on multiple large datasets.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "conforming" may encompass a variety of actions or descriptions. For example, "conforming" may include complying, adhering, observing, following, obeying, accepting, and/or the like. Furthermore, "conforming" may also include matching (e.g., matching records across data sources), corresponding (e.g., corresponding data fields), and/or the like. Also, "conforming" may include satisfying, fulfilling, suiting, and/or the like.

Data processing is a critical component of information systems and has become ubiquitous across many industries. The proliferation of digital technology now requires many businesses to regularly store and process massive amounts of data in order to stay competitive or remain in compliance with industry or governmental standards. Sometimes the data is so voluminous that the only way to efficiently process it is on a distributed computing system. Distributed computing systems maximize efficiency for data processing by distributing the data processing tasks across multiple computing nodes. Nodes are programmed to work together to achieve a common goal and can be hardware devices, like computers, or software processes. However, even with access to distributed computing systems, processing large amounts of data can require a substantial investment of time, manpower, and funding. Specifically, data must be prepared for use in distributed computing systems. This preparation may involve becoming familiar with the data to understand its context, removing extraneous data and outliers, masking private data, and transforming and enriching data. Because of these preparation requirements, businesses may be forced to employ highly skilled teams of programmers and computer engineers to effectively leverage distributed systems. Further, data is often pulled from multiple sources that operate independently of one another and do not share any uniform method of storing or retrieving that data, making it even more difficult to manage data-processing.

As described in further detail herein, the present disclosure provides a solution to the above-referenced problems by implementing a system to manage the complex tasks related to distribution of data across computing resources. Such a system may further comprise a data centric language which is self-documenting and easy to understand. The present disclosure solves these technical problems by initializing a distributed execution engine-like that shown as system 130, system 600, and/or system 700—which may further comprise an execution engine artificial intelligence model like that shown as artificial intelligence subsystem 200 of FIG. 2. For instance, the distributed execution engine acts to build a tree of execution, creating periodic checkpoints, storing those checkpoints for retrieval at a later time, and using the data stored in those checkpoints as a baseline for additional data sources or output. The execution engine then distributes processing of that data across processing clusters in an analytics engine and produces output for generation of a structured dataset that is consistent, reproducible, and auditable.

Accordingly, the present disclosure provides for an execution engine that accepts an at least one configuration file which describes the sources of data to be used and a script file which contains instructions on how that data should be processed. The script file is written in a data centric language (DCL) that is easy to understand and conveys its purpose and function without the need for extensive documentation.

What is more, the present disclosure provides a technical solution to a technical problem. As described herein, the technical problem includes introducing large amounts of unstructured data into a distributed computing system for processing. The technical solution presented herein allows for preparation of that data so that it can leverage the processing power of parallel processing on a distributed computing system. In particular, the execution engine system is an improvement over existing solutions to the problem of processing unstructured data (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for combining, interpreting, and distributing non-uniform datasets into structured datasets 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) subsystem architecture 200, in accordance with an embodiment of the invention. The artificial intelligence subsystem 200 may include a data acquisition engine 202, data ingestion engine 210, data pre-processing engine 216, AI model tuning engine 222, and inference engine 236.

The data acquisition engine 202 may identify various internal and/or external data sources to generate, test, and/or integrate new features for training the artificial intelligence model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence model 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI model tuning engine 222 may be used to train an artificial intelligence model 224 using the training data 218 to make predictions or decisions without explicitly being programmed to do so. The artificial intelligence model 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence model type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence model, the AI model tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained artificial intelligence model 232 is one whose hyperparameters are tuned and model accuracy maximized.

The trained artificial intelligence model 232, similar to any other software application output, can be persisted to storage, file, memory, or application, or looped back into the processing component to be reprocessed. More often, the trained artificial intelligence model 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence models that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow for combining, interpreting, and distributing non-uniform datasets into structured datasets, in accordance with an embodiment of the disclosure. In some embodiments, a system (e.g., similar to one or more of the systems described herein with respect to FIGS. 1A-1C and FIGS. 6 and 7) may perform one or more of the steps of process flow 300. For example, a system (e.g., the system 130 described herein with respect to FIG. 1A-1C) may perform the steps of process 300. In some embodiments, an artificial intelligence engine (e.g., such as the AI subsystem shown in FIG. 2) may perform some or all of the steps described in process flow 300.

As shown in block 302, the process flow 300 may include the step of identifying at least one configuration file, the at least one configuration file comprising at least one location associated with one or more datasets or at least one script file comprising at least one instruction. In some embodiments, the at least one configuration file may comprise a configuration which may comprise a set of parameters, settings, or options that describe the data source to be used with the script file. By way of non-limiting example, a configuration file may be a human-readable file in a plain text format that is compatible with any common text editor. In some embodiments, the at least one configuration file may provide information about where to access data. By of non-limiting example, a location instruction could be in the form of a file path, whereby a file path is a string of characters used to uniquely identify the location of data and/or other files.

As used herein, a location may refer to any digital place where data is stored. Some non-limiting examples of locations where data or script files could be stored include but are not limited to hard drive disks, compacts disks, network drives, USB flash drives, and/or the like. A network is a group of two or more computing components that are linked together. A network may comprise a file server, whereby a file server comprises a computer program or device that is dedicated to storing computer files. In some embodiments, script files or datasets may be stored in one or more file servers. In some embodiments, the script file or datasets may be located in a folder. A folder is a virtual location which houses application(s), document(s), data, file(s), and/or other sub-folder(s). As used herein, folders may be organized into a hierarchical structure, with the first folder in the hierarchy stored on a computer drive. A computer drive is an internal or external computing component that stores and reads information, wherein that information that is not easily removed. By way of non-limiting example, a computer drive may be a hard drive, a solid-state drive, a disk drive, and/or a USB drive. Additionally, such an at least one script file and the one or more datasets are described in further detail below. A configuration file is a file used to set the parameters and initial settings for a computer program, application, server process, or operating system. By way of non-limiting example, a configuration file for a video streaming service on a smart phone may comprise a stored username, preferred resolution, and notification settings.

As shown in block 304, the process flow 300 may include the step of identifying the at least one script file based on at least one location associated with the at least one configuration file. For example, a location may be explicitly specified in the at least one configuration file. A script file is a program or sequence of instructions that is interpreted or carried out by another program, rather than by a processor. In some embodiments, the script may comprise a text file. In some embodiments, the script file may be written in an existing scripting language, such as JavaScript™. In some embodiments, the entire script file is written in a data centric language.

In some embodiments the system may identify the location of the script file using a directory, index, and/or registry mechanism with one or more keywords. For instance, the at least one configuration file could identify the location of the script file by using a unique location identifier or by reading a specified file path (e.g., C: \user\docs\scriptfile.txt). In some embodiments, the location identifier may be a global unique identifier (GUID), which is a number that is generated to create a unique identity for an entity such as a document. In some embodiments, the GUID may be generated by the system using a command that produces a unique sequence of random numbers. In some embodiments, the system may access an outside tool, such as a GUID-generator website to assign a GUID.

Further, and in some embodiments, the script file may be written in a data centric language (DCL). As used herein, the data centric language comprises a programming language with extensible language features that is self-documenting and easy to use. An extensible language feature is a characteristic of a language that allows users to create new notations, data structures, or operations. An extensible language feature is set of mechanisms which establish a systematic framework for defining new linguistic constructions in terms of already existing constructions. In other words, because the DCL is a self-documenting language with extensible language features a businessperson without programming expertise could write the contents of the script file in layman's terms (e.g., human-readable language) to specify the parameters for processing data. The extensible language features may comprise terms that are readily understandable by a layman and used by the system to convert to a computer programming language that a computer or processor would understand. The DCL is also self-documenting in that it follows naming conventions and structured programming conventions to enable use of the system without specific prior knowledge of it. For example, a self-documenting language might have an "character_count" function that counts the letters in a string. A user could simply write "character_count(I love school)" to find out that the phrase "I love school" has 11 characters. To accomplish the same goal in a programming language that is not self-documenting, the user might have to write a series of commands that do not have an obvious connection to the user's natural language.

In some embodiments, the execution engine takes the script file written in the data centric language, analyzes its structure, syntax, and semantics, validates its structure, builds a tree of execution, and executes the instructions in the script file. Such a tree of execution is described in further detail below with respect to FIG. 3.

As shown in block 306, the process flow 300 may include the step of retrieving the at least one dataset based on the at least one location associated with the at least one configuration file. In some embodiments, the location identifier may be a universal unique identifier (UUID). A UUID is a 128-bit number used to uniquely identify information in a unique and standardized way. Use of a UUID to identify dataset(s) may prevent conflicts that could otherwise arise when that data is retrieved from a data source. For instance, data requests with a UUID can lead to ambiguity or cause the same dataset to be sent to the requesting system multiple times. Using a UUID to request a dataset from a data source is ideal for retrieving data from multiple sources because they can be used on any system, regardless of the operating system or platform. In some embodiments, the UUIDs are generated using algorithms that include random numbers to reduce the probability of the same UUID being generated. By ensuring that the data source identifiers are unique, they can be used for different types of entities, such as databases, APIs, or mainframes.

Retrieving one or more datasets may involve one or more of the following steps generating a request that includes the UUID. The request is sent by a network protocol to the data source. A network protocol comprises a set of rules, conventions, and data structures that dictate how devices exchange data across a network. In some embodiments, the network protocol may be a commonly used protocol such as HTTP. The data source then processes the request, looks up the UUID to find the corresponding dataset, and returns a response to the requesting computer that includes both the content requested and the associated metadata. Metadata is data that provides information about the data sent and may provide information about the structure or source of the content.

As shown in block 308, the process flow 300 may include the step of building a tree of execution based on the one or more datasets, wherein the tree of execution comprises at least one node, and wherein the at least one node comprises data. When requesting datasets that are unstructured, the system needs to be able to organize the data as it is received based on what data is actually available. In some embodiments, the datasets received may have at least one flexible schema. As used herein, a dataset with a flexible schema may contain records with different structures. As the system receives datasets with flexible schema, it must be able to build the tree of execution based on the structure of the actual record that it receives. For instance, the system may send a request to a library's database to request books in a specific genre. The library's data may be incomplete, such as not including some of the authors or publishers. In order to handle the various records with different numbers of elements, the system can construct a tree of execution with each record represented as a node containing key value pairs. A key value pair comprises a key and a value. They key is a unique label that identifies an attribute type and the value is the specific information associated that key. In the library database example, there might be a key for "title" with the value "Book of World Records." Structuring each record as a set of key value pairs allows for the system to efficiently organize and retrieve information.

In some embodiments, the tree of execution comprises a blueprint to maintain and execute instructions with various check points, data sources, and transformations to produce one or many outputs. Checkpoints are predefined points in a process where the current state of the system is saved, allowing the system to recover or resume that specific state in case of failures or interruptions. For instance, the example above in which the system requested book information from a library might involve checking the database, processing the request, and formatting the response. After successfully retrieving details for some specified number of books, the system may record the publication date of the last successfully recorded book. If there is a failure during retrieval of additional book data, the system can go back to the state it was in when it recorded the checkpoint. Checkpointing conserves computing resources and time by ensuring that the system does not have to start over in case of a failure. In some embodiments, executing the script file comprises deriving columns, pulling data from various sources, taking checkpoints, and enriching the data stored in those checkpoints with data from some other source.

As shown in block 310, the process flow may include the step of executing the script file on two or more datasets in parallel on an at least one computational cluster, wherein the at least one computational cluster comprises an at least one computing component, wherein the at least one computing component comprises an at least one node, and wherein each node executes the script file on at least one dataset. In some embodiments, the computational cluster comprises multiple interconnected computing components, or nodes. In some embodiments, the nodes (or computing components) work together to process the data from different datasets, with each node set to perform the same task on different data sets or on different parts of the data from each dataset. In some embodiments, each node may execute a different part of the script file(s), wherein each part comprises sub-tasks and wherein the sub-tasks comprise instructions from the script file for the data, and whereby each node operates on the same data.

As shown in block 312, the process flow 300 may include generating an output which is a structured dataset, wherein the structured dataset comprises a standardized format associated with the at least one instruction of the script file. The structure of the structured dataset may serve as a blueprint for the organization and purpose of the output, with the blueprint instructions being stored in the script file. This blueprint may comprise at least one schema for organizing the output. In some embodiments, the schema relies on identifying characteristics of data elements to provide a consistent structure for the output. Data elements are units of information in a dataset. In some embodiments, data elements comprise each item in a list, each field in a database, or each cell in a spreadsheet. By way of non-limiting example, the schema may specify the organizational structure of a database which the structured dataset may be stored in after its generation. This structure could include information such as table names, fields, or other logical constraints. For example, the structure could include a logical constraint specifying a condition such as to include one field only if the value in another field corresponds to a specified range or value. For instance, the structure might include a constraint specifying that, in a dataset comprising first, middle, and last names, the middle name should be removed if the first and last name are duplicated somewhere else in the dataset.

FIG. 4 illustrates a process flow 400 for executing a linear series of operations to transform non-uniform data from one or more datasets, in accordance with an embodiment of the disclosure. In some embodiments, a system (e.g., similar to one or more of the systems described herein with respect to FIGS. 1A-1C and FIGS. 6 and 7) may perform one or more of the steps of process flow 400. For example, a system (e.g., the system 130 described herein with respect to FIG. 1A-1C) may perform the steps of process 400. In some embodiments, an artificial intelligence engine (e.g., such as the AI subsystem shown in FIG. 2) may perform some or all of the steps described in process flow 400.

In other words, process flow 400 illustrates a process for executing the computer-readable program code, wherein executing the computer-program code may comprise sorting the data into different categories based on similarities or shared characteristics.

In some embodiments, and as shown in block 402, the process flow 400 may include the step of identifying an element associated with one or more datasets, wherein the at least one element comprises at least one characteristic. For example, characteristics of data elements may be based on various attributes. An attribute is a property that defines a fundamental unit of information in a dataset and represents a specific type of information about that data unit, including but not limited to data type, value range, level of detail, source, and/or format. In this manner, the characteristics of data elements may comprise at least one attribute and/or a combination of attributes. By way of non-limiting example, data types may comprise integers, strings, and/or symbols. The value range of a data element may be the range of values that the element can take on. For instance, a data element may represent a person's birth year and the value range of the data element is the range of ranges that the birth year could be (e.g., not before 1900). The level of detail of a data element could be exemplified by a date, which could include a day, or a day and a month, or a day and a month and a year. In some embodiments, sources of data may comprise mainframes, APIs, databases, and/or the like. The data of the dataset(s) may be formatted as text, binary, alphanumeric characters, strings of letters, numbers, and/or in some other way.

In some embodiments, and as shown in block 404, the process flow 400 may include the step of arranging the at least one element associated with the one or more datasets based on the at least one characteristic. In some embodiments, arranging the at least one element may mean that data is grouped by meaning. For instance, all data related to locational data could be grouped together. Similarly, in another embodiment, data related to a specific data source—such as a particular database—may be grouped together.

In some embodiments, and as shown in block 406, the process flow 400 may include the step of identifying at least one pattern in the one or more datasets based on the at least one characteristic. In some embodiments, a pattern-recognition algorithm may be provided in the at least one script file as a set of instructions. By way of non-limiting example, the script file may contain an instruction for the system to classify the data in a dataset by type, identify the data type that occurs most frequently for each element, and then store that data type as the expected data type to be associated with that element. By way of non-limiting example, a dataset containing the number people that travel between cities each day may comprise records with two elements: destination city, and number of travelers. The system may identify a pattern in the dataset wherein, for the majority of records, each destination city is a string, and the corresponding number of people is an integer. In accordance with the instructions contained in the script file, it would then store the string data type as being associated with a city name and an integer as being associated with the number of travelers.

In some embodiments, a pattern may be determined when datasets from a plurality of data sources share one or more characteristics that are associated with data elements. The system may identify similarities in the type of characteristic and create groups of data to manage and prepare the data for processing. For instance, a pattern may be determined by identifying if changes in one element correlate to changes with another element. By way of non-limiting example, two datasets may have a list of people's names, addresses, and phone numbers and the script file may instruct the system to collect all of the names into one group, the phone numbers in another group, and the addresses in a third group. The data could then be processed in those groups to see, for example, the distribution of area codes or distance of addresses from a central location on a map. By grouping the names separately, the system can reduce processing time, as the processor will only have to process the phone numbers, or addresses, and not the names.

As shown in block 408, the process flow 400 may include the step of deleting at least one element based on an inconsistency with the identified at least one pattern, wherein the inconsistency is based on a matching of the at least one element and the at least one pattern. In the example above involving travelers and city names, if the system then identifies a record which includes 13.2 as the number of travelers to a particular city, it will recognize this as being inconsistent with the pattern of strings and accompanying integers and delete the inconsistent number (i.e., 13.2). In the case where the data element is identified to be a floating-point number the data element would not fall into either of categories of strings or integers and the system would flag it for deletion. A floating-point number refers to a positive of negative whole number with a decimal point.

As shown in block 410, the process flow 400 may include the step of inserting at least one new element in the one or more datasets based on at least one missing element. In some embodiments, this step may comprise adding context (e.g., a new element) to existing records (e.g., to a dataset, a structured document, and/or the like). By way of non-limiting example, a database may comprise multiple records, with each record providing a service provider and geolocation data for landline telephone numbers. If one of the records in that database contained a phone number that did not have an area code, the system might be able to reference other records in the system, comparing the geolocation data, to determine what the area code should be. If the determination was made with a high level of confidence (e.g., based on a confidence level), the system could insert the area code into the record, thereby completing it. A confidence level represents the degree of certainty associated with the inserted data. In one embodiment, a confidence level may be determined by establishing a threshold distance from the average of all data points, such that only data points comprising values inside that threshold distance is considered close matches.

As shown in block 412, the process flow 400 may include the step of merging data from one or more datasets based on a completeness or relatedness of the one or more datasets, wherein the one or more datasets share at least one element with at least one matching characteristic. For instance, and returning to the previous example, there may be a circumstance in which a database contains two records with identical geolocation information, where one of the records has an associated phone number and the other record has an associated service provider. By identifying the common element (e.g., the geolocation data), the system could merge the two incomplete records to produce one complete record.

FIG. 5 illustrates a process flow 500 for running a set of rules to ensure the validity of the datasets based on logical consistency, data type, external rules, and uniqueness, in accordance with an embodiment of the disclosure. In some embodiments, a system (e.g., similar to one or more of the systems described herein with respect to FIGS. 1A-1C and FIGS. 6 and 7) may perform one or more of the steps of process flow 500. For example, a system (e.g., the system 130 described herein with respect to FIG. 1A-1C) may perform the steps of process 500. In some embodiments, an artificial intelligence engine (e.g., such as the AI subsystem shown in FIG. 2) may perform some or all of the steps described in process flow 500.

In some embodiments, and as shown in block 502, process flow 500 may include the step of verifying that data in one or more datasets have a correct data type. In some embodiments, these steps may comprise: declaring variables with specific data types, verifying that data types are compatible with operations to be performed, and/or comparing the data types present in a dataset with those specified in a predefined schema. For instance, a dataset may comprise information from an online retailer, such as product name, price, and available quantity and a pre-defined schema could specify that the expected data types for those attributes are a string, a floating-point number, and an integer, respectively. In some embodiments, as shown in block 504, the process flow 500 may include the step of verifying that data in the one or more datasets is logically consistent. The logical consistency of data may be determined according to a model structure. The model structure may establish relationships that should exist among data elements or attributes of those elements. By way of non-limiting example, a data element may comprise a number of children that, when surveyed, reported they prefer chocolate ice cream over vanilla. Another data element may report the percentage, rather than the number, of children who prefer chocolate ice cream. In this case, the percentage would equate to the quantity of the numerator of the fraction divided by the denominator of the fraction with the entire quantity divided by 100. The system would check that the percentage represented the correct mathematical relationship to the fraction as a way of ensuring logical consistency. In some embodiments, the logical consistency of data may be determined by ensuring that different pieces of data do not contradict each other.

In some embodiments, and as shown in block 506, the process flow 500 may include the step of ensuring that at least one field used in the one or more datasets conforms to one or more external formatting rules. For instance, formatting rules may require ensuring that units of measurement are consistent throughout the dataset. In some embodiments, formatting rules may specify the format for time or date stamps or that data is of a particular type.

In some embodiments, and as shown in block 508, the process flow 500 may include the step of verifying that two or more datasets are unique from one another based on the at least one element associated with each dataset. In some embodiments, this step may be accomplished by applying uniqueness constraints to ensure that the combination of values in specified fields are unique across all records. Uniqueness constraints are rules applied to the two or more datasets to ensure that certain fields have unique values across all records. A uniqueness constraint may designate a primary field and require that the value in that field is different for each record, thereby preventing duplicate records and maintaining data integrity.

FIG. 6 illustrates an exemplary system for combining, interpreting, and distributing non-uniform datasets into structured datasets in accordance with an embodiment of the disclosure. In some embodiments, a system (e.g., similar to one or more of the systems described herein with respect to FIGS. 1A-1C and FIGS. 6 and 7) may perform one or more of the steps of generating and/or operating exemplary system 600. For example, a system (e.g., the system 130 described herein with respect to FIG. 1A-1C) may perform the steps of generating and/or operating exemplary system 600. In some embodiments, an artificial intelligence engine (e.g., such as the AI subsystem shown in FIG. 2) may perform some or all of the steps described generating and/or operating exemplary system 600.

In some embodiments, the process for combining, interpreting, and distributing non-uniform datasets into structured datasets would include an initialization step. The initialization step comprises the steps of retrieving the at least one script file, at least one configuration file, and reading those files to determine the sources of data that will be processed.

In some embodiments, the process may also include a step for parsing and validating the script. Parsing data comprises sorting it, dividing into organized groups, and formatting it. By way of example, a dataset may comprise a text document comprising a list of dates and times that an employee worked, with each data-time pair contained in parenthesis and the different pairs separated by a semi-colon. The script file may contain instructions for parsing that data and formatting it in a particular way before processing. In this case, the system may complete the steps of adding a new line after each date-time pair, removing the parenthesis, replacing the semi-colon with a comma, and changing the format of each date to be in the form dd/mm/yyyy. Parsing and formatting data before processing in a distributed system allows computer clusters to efficiently process it receives, leading to faster and more effective data analysis. Validating a script refers to the process of verifying that the data is free of errors. In some embodiments, the validation step may include identifying patterns or removing duplicate records. In some embodiments, the process may include the step of interpreting the DCL script, comprising reading the instructions in the script file and rewriting them, as necessary, to be compatible with requirements of the processor.

FIG. 7 illustrates a system for checkpointing data during data processing on a distributed computing system, in accordance with an embodiment of the disclosure. In some embodiments, a system (e.g., similar to one or more of the systems described herein with respect to FIGS. 1A-1C and FIGS. 6 and 7) may perform one or more of the steps of generating an operating system 700. For example, a system (e.g., the system 130 described herein with respect to FIG. 1A-1C) may perform the steps of generating an operating system 700. In some embodiments, an artificial intelligence engine (e.g., such as the AI subsystem shown in FIG. 2) may perform some or all of the steps of generating an operating system 700.

In some embodiments, the system may retrieve certain data according to coordinates specified in the at least one configuration file and perform operations provided in the script file. The system may then generate a first set of output data before continuing on to perform the next operation(s) (e.g., a banking website may accept a transfer request from a user by first validating the user's identity, then taking user input for the amount to be transferred, verifying that the requested that amount is available, and displaying the user's balance). At specified intervals, the system creates checkpoints, wherein the checkpoints represent a snapshot of the state of the system. If the system needs to access that data after performing additional operations, it is stored safely for reference. For instance, if a checkpoint is created, additional operations are performed, and when/if there is a system failure, the system can retrieve the checkpoint and reestablish the state of the system at that point in time rather than starting over. Continuing with the above example, the system may create a checkpoint which stores the validation status after the user's identity is validated. If the system were to fail after that checkpoint is created, it could be restarted without having to reperform the user-validation operation. It would then accept the additional input (i.e., the user's requested amount of funds), before producing the next output (i.e., displaying a balance).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination. It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for a distributed execution engine for combining, interpreting, and distributing non-uniform datasets into structured datasets, the system comprising:

a memory device with computer-readable program code stored thereon;

a communication device;

a processing device operatively coupled to the memory device and the communication device, wherein the processing device is configured to execute the computer-readable program code to:

identify at least one configuration file, the at least one configuration file comprising at least one location associated with one or more datasets or at least one script file comprising at least one instruction;

identify the at least one script file based on the at least one location associated with the at least one configuration file;

retrieve the one or more datasets based on the at least one location associated with the at least one configuration file, wherein the one or more datasets comprise one or more flexible schemas organized based on data available in the one or more datasets;

identify, by an execution engine, at least one instruction from the at least one script file, wherein the at least one instruction is written in a data centric language;

build, by the execution engine and using the at least one instruction, a tree of execution based on the one or more datasets and the data available in the one or more datasets, wherein the tree of execution comprises a plurality of nodes, and wherein the plurality of nodes comprises the at least one instruction corresponding to the data available and the one or more flexible schemas, and wherein each node comprises a key value pair corresponding to the data available in each node;

execute the at least one instruction at each node based on the key value pair on the one or more datasets in the tree of execution, wherein the key value pair indicates at least one present attribute and at least one present value from the data available at each node, wherein the execution is performed in parallel for at least two or more nodes in the tree of execution and using at least one computational cluster comprising at least one computing component at each node and wherein the two or more nodes work together to process data from the one or more datasets using sub-tasks from the at least one script file;

and generate an output comprising a structured dataset from the one or more datasets and based on the execution of the at least one instruction using the tree of execution, wherein the structured dataset comprises a standardized format of the one or more datasets based on the key value pair for each dataset of the one or more datasets.

2. The system of claim 1, wherein building the tree of execution further comprises:

generating at least one checkpoint, and wherein the at least one checkpoint comprises a periodic storage of at least one intermediate result before the output of the structured dataset of the execution of the at least one instruction for subsequent retrieval.

3. The system of claim 1, wherein the data centric language comprises at least one extensible language feature, wherein the at least one extensible language feature provides a conversion between the at least one instruction and building the tree of execution.

4. The system of claim 1, wherein the processing device is configured to execute the computer-readable program code to execute a linear series of operations to transform input, wherein the linear series of operations comprises:

identifying at least one element associated with one or more datasets, wherein the at least one element comprises at least one characteristic;

arranging the at least one element associated with the one or more datasets based on the at least one characteristic;

identifying at least one pattern in the one or more datasets based on the at least one characteristic;

deleting at least one element based on an inconsistency with the identified at least one pattern, wherein the inconsistency is based on a matching of the at least one element and the at least one pattern;

inserting at least one new element in the one or more datasets based on at least one missing element; and merging data from one or more datasets based on a completeness or a relatedness of the one or more datasets wherein the one or more datasets share at least one element with at least one matching characteristic.

5. The system of claim 1, wherein the processing device is configured to execute the computer-readable program code to run a set of rules to ensure the validity of the scripts, wherein the running of the set of rules comprise one or more of the following steps:

verifying that data in the one or more datasets has a correct data type;

verifying that data in the one or more datasets is logically consistent;

ensuring that at least one field used in the one or more datasets conform to one or more external formatting rules; and verifying that two or more datasets are unique from one another based on the at least one element associated with each dataset.

6. The system of claim 1, wherein retrieval of the at least one data source further comprises defining each data source using at least one coordinate that comprises a system name, a dataset name, or a version.

7. The system of claim 1, wherein the script file comprises at least one schema for organizing the output and wherein the at least one schema comprises at least one attribute.

8. The system of claim 1, wherein the at least one schema further comprises a consistent structure for the output.

9. The system of claim 1, wherein the tree of execution comprises a checkpoint corresponding to each sub-task at each node, and wherein the checkpoint comprises a current state for the data within each node.

10. The system of claim 1, wherein the two or more nodes process data in parallel and simultaneously.

11. A computer program product for a distributed execution engine for combing, interpreting, and distributing non-uniform datasets into structured datasets, the computer program product comprising a non-transitory computer-readable medium having computer-readable program code portions embodied therein, the computer-readable program code portions comprising:

an executable portion configured for identifying at least one configuration file, the at least one configuration file comprising at least one location associated with one or more datasets or at least one script file comprising at least one instruction;

an executable portion configured for identifying the at least one script file based on the at least one location associated with the at least one configuration file;

an executable portion configured for retrieving the one or more datasets based on the at least one location associated with the at least one configuration file, wherein the one or more datasets comprise one or more flexible schemas organized based on data available in the one or more datasets;

an executable portion configured for identifying, by an execution engine, at least one instruction from the at least one script file, wherein the at least one instruction is written in a data centric language;

an executable portion configured for building, by the execution engine and using the at least one instruction, a tree of execution based on the one or more datasets and the data available in the one or more datasets, wherein the tree of execution comprises a plurality of nodes, and wherein the plurality of nodes comprises the at least one instruction corresponding to the data available and the one or more flexible schemas, and wherein each node comprises a key value pair corresponding to the data available in each node;

an executable portion configured for executing the at least one instruction at each node based on the key value pair on the one or more datasets in the tree of execution, wherein the key value pair indicates at least one present attribute and at least one present value from the data available at each node, wherein the execution is performed in parallel for at least two or more nodes in the tree of execution and using at least one computational cluster comprising at least one computing component at each node and wherein the two or more nodes work together to process data from the one or more datasets using sub-tasks from the at least one script file;

and an executable portion configured for generating an output comprising a structured dataset from the one or more datasets and based on the execution of the at least one instruction using the tree of execution, wherein the structured dataset comprises a standardized format of the one or more datasets based on the key value pair for each dataset of the one or more datasets associated with the at least one instruction of the script file.

12. The computer program product of claim 11, wherein building the tree of execution further comprises generating at least one checkpoint, and wherein the at least one checkpoint comprises periodic storage of at least one intermediate result before the output of the structured dataset of the execution of the at least one instruction script for retrieval at a later time.

13. The computer program product of claim 11, wherein the data centric language comprises at least one extensible language feature, wherein the at least one extensible language feature provides a conversion between the at least one instruction and building the tree of execution.

14. The computer program product of claim 11, wherein the processing device is configured to execute the computer-readable program code to execute a linear series of operations to transform input, wherein the linear series of operations comprise one or more of the following steps:

identifying at least one element associated with one or more datasets, wherein the at least one element comprises at least one characteristic;

arranging the at least one element associated with the one or more datasets based on the at least one characteristic;

identifying at least one pattern in the one or more datasets based on the at least one characteristic;

deleting at least one element based on an inconsistency with the identified at least one pattern, wherein the inconsistency is based on a matching of the at least one element and the at least one pattern;

inserting at least one new element in the one or more datasets based on at least one missing element; and merging data from one or more datasets based on a completeness or a relatedness of the one or more datasets wherein the one or more datasets share at least one element with at least one matching characteristic.

15. The computer program product of claim 11, wherein the processing device is configured to execute the computer-readable program code to run a set of rules to ensure the validity of the scripts, wherein the running of the set of rules comprise one or more of the following steps:

verifying that data in the one or more datasets has a correct data type;

verifying that data in the one or more datasets is logically consistent;

ensuring that at least one field used in the one or more datasets conform to one or more external formatting rules; and verifying that two or more datasets are unique from one another based on the at least one element associated with each dataset.

16. The computer program product of claim 11, wherein retrieval of the at least one data source further comprises defining each data source using at least one coordinate that comprises a system name, a dataset name, or a version.

17. A computer-implemented method for a distributed execution engine for combining, interpreting, and distributing non-uniform datasets into structured datasets, the computer-implemented method comprising:

identifying at least one configuration file, the at least one configuration file comprising at least one location associated with one or more datasets or at least one script file comprising at least one instruction;

identifying the at least one script file based on the at least one location associated with the at least one configuration file;

retrieving the one or more datasets based on the at least one location associated with the at least one configuration file, wherein the one or more datasets comprise one or more flexible schemas organized based on data available in the one or more datasets;

identifying, by an execution engine, at least one instruction from the at least one script file, wherein the at least one instruction is written in a data centric language;

building, by the execution engine and using the at least one instruction, a tree of execution based on the one or more datasets and the data available in the one or more datasets, wherein the tree of execution comprises a plurality of nodes, and wherein the plurality of nodes comprises the at least one instruction corresponding to the data available and the one or more flexible schemas, and wherein each node comprises a key value pair corresponding to the data available in each node;

executing the at least one instruction at each node based on the key value pair on the one or more datasets in the tree of execution, wherein the key value pair indicates at least one present attribute and at least one present value from the data available at each node, wherein the execution is performed in parallel for at least two or more nodes in the tree of execution and using at least one computational cluster comprising at least one computing component at each node and wherein the two or more nodes work together to process data from the one or more datasets using sub-tasks from the at least one script file;

and generating an output comprising a structured dataset from the one or more datasets and based on the execution of the at least one instruction using the tree of execution, wherein the structured dataset comprises a standardized format of the one or more datasets based on the key value pair for each dataset of the one or more datasets.

18. The computer implemented method of claim 17, wherein building the tree of execution further comprises generating at least one checkpoint, and wherein the at least one checkpoint comprises periodic storage of at least one intermediate result before the output of the structured dataset of the execution of the at least one instruction for subsequent retrieval.

19. The computer implemented method of claim 17, wherein the data centric language comprises at least one extensible language feature, wherein the at least one extensible language feature provides a conversion between the at least one instruction and building the tree of execution.

* * * * *